US008224565B2

(12) United States Patent  
Chang

(10) Patent No.: US 8,224,565 B2  
(45) Date of Patent: Jul. 17, 2012

(54) METHOD AND SYSTEM FOR AUTOMATICALLY CREATING POI BY IDENTIFYING GEOGRAPHIC INFORMATION ON A SCREEN OF A PORTABLE NAVIGATION DEVICE

(75) Inventor: Chien-Yang Chang, Taoyuan (TW)

(73) Assignee: Mitac International Corp., Taoyuan (TW)

( * ) Notice: Subject to any disclaimer, the term of this patent is extended or adjusted under 35 U.S.C. 154(b) by 450 days.

(21) Appl. No.: 12/497,664

(22) Filed: Jul. 4, 2009

(65) Prior Publication Data

US 2010/0161211 A1 Jun. 24, 2010

(30) Foreign Application Priority Data

Dec. 24, 2008 (TW) .............................. 97150383 A

(51) Int. Cl.  
*G01C 21/00* (2006.01)

(52) U.S. Cl. ........ 701/400; 701/412; 701/438; 701/450; 340/995.19

(58) Field of Classification Search .................. 701/200, 701/201, 206, 208, 209, 212, 213; 340/995.19, 340/995.22  
See application file for complete search history.

(56) References Cited

U.S. PATENT DOCUMENTS

2004/0104842 A1 6/2004 Drury et al.  
2005/0203698 A1* 9/2005 Lee ............................... 701/200

FOREIGN PATENT DOCUMENTS

CN 101246017 A 8/2008  
CN 101419074 A 4/2009

OTHER PUBLICATIONS

Office Action of corresponding CN application, issued on Sep. 14, 2011.

* cited by examiner

*Primary Examiner* — Gertrude Arthur Jeanglaude  
(74) *Attorney, Agent, or Firm* — Wang Law Firm, Inc.; Li K. Wang

(57) ABSTRACT

A method for automatically creating POI by identifying geographic information on a screen of a portable navigation device is disclosed. A first geographic information is retrieved from an information page shown in the screen of the portable navigation device and recognized by comparing with the first geographic information with a geographic information of landmarks stored in a map database of the portable navigation device. It is determined whether the first geographic information is in the map database. If the geographic information is in the map database, a first GPS coordinate corresponding to the first geographic information is obtained and stored as a first POI.

16 Claims, 3 Drawing Sheets

METHOD AND SYSTEM FOR AUTOMATICALLY CREATING POI BY IDENTIFYING GEOGRAPHIC INFORMATION ON A SCREEN OF A PORTABLE NAVIGATION DEVICE

CROSS REFERENCE TO RELATED APPLICATIONS

This Application claims priority of Taiwan Patent Application No. 97150383. filed on Dec. 24, 2008, the entirety of which is incorporated by reference herein.

BACKGROUND OF THE INVENTION

1. Field of the Invention

The invention relates to image recognition or navigation, and more particularly to a method and system for automatically creating point of interest (POI) by identifying geographic information on a screen of a portable navigation device.

2. Description of the Related Art

Global positioning system (GPS) functions are applied to mobile devices for locating objects. Accordingly, of GPS navigation products, mobile navigation devices are the most popular.

Mobile navigation devices comprise embedded and portable navigation devices. Embedded navigation devices are mounted to the body of vehicles. Portable navigation devices include GPS navigation devices and portable electronic devices with GPS navigation functions such as personal mobile devices (personal digital assistants (PDA) or smart phones).

However, for personal mobile devices with GPS navigation functions, when navigation information is required, an address, a landmark, or a geographical name must be inputted manually or via voice, for generating navigation information and a route. Since most personal mobile devices with GPS navigation functions already comprises user requested information functions such as weather updates, tourist guides, on-line map information updates, and so forth, as examples, it would be more convenient for users if the personal mobile devices with GPS navigation functions can generate routes based on the navigation information shown on a screen of the personal mobile devices with GPS navigation functions.

Thus, method and system for navigating to an automatically created POI by recognizing navigation information shown on a screen of a portable navigation device to generate a route.

BRIEF SUMMARY OF THE INVENTION

Methods for automatically creating POI by identifying geographic information on a screen of a portable navigation device are provided. An exemplary embodiment of a method for automatically creating POI by identifying geographic information on a screen of a portable navigation device comprises the following. A first geographic information is retrieved from an information page shown on the screen of the portable navigation device. The first geographic information is recognized by comparing with a geographic information of landmarks stored in a map database of the portable navigation device. It is determined whether the first geographic information is in the map database. A first GPS coordinate corresponding to the geographic information is obtained and stored as a first POI, if the geographic information is in the map database.

Another embodiment of the method for automatically creating POI by identifying geographic information on a screen of a portable navigation device comprises the following. Scenic spot information is retrieved from an information page shown on the screen of the portable navigation device. The scenic spot information is recognized by comparing with a map database of the portable navigation device when the recognizing operation is complete. It is determined whether the scenic spot information is in the map database. A link between the scenic spot information and a corresponding GPS coordinate is generated if the first geographic information is in the map database.

Another embodiment of the method for automatically creating POI by identifying geographic information on a screen of a portable navigation device comprises the following. A telephone number is retrieved from an information page shown on the screen of the portable navigation device. The telephone number is recognized. A link between the telephone number and a communication module of the portable navigation device is generated when the recognizing operation is complete.

Systems for automatically creating POI by identifying geographic information on a screen of a portable navigation device are provided. An exemplary embodiment of a system for automatically creating POI by identifying geographic information on a screen of a portable navigation device comprises a screen, a map database, a GPS module, a wireless module, a retrieve module, a recognition module, and a route generating module. The retrieve module retrieves geographic information from the information page shown on the screen. The recognition module retrieves the geographic information from the retrieve module and performs a recognition operation to the geographic information. The route generation module retrieves the geographic information from the recognition module, compares the first geographic information with a geographic information of landmarks stored in the map database to determine whether the first geographic information is in the map database, obtains a first GPS coordinate corresponding to the first geographic information from the map database or via the GPS module if the geographic information is in the map database, stores the first GPS coordinate as a first POI.

An exemplary embodiment of computer-readable medium encoded with computer executable instructions for performing a method for automatically creating POI by identifying geographic information on a screen of a portable navigation device is further provided. The computer executable instructions comprise retrieving a first geographic information from an information page shown in the screen of the portable navigation device, recognizing the first geographic information by comparing the first geographic information with a geographic information of landmarks in a map database of the portable navigation device, determining whether the first geographic information is in the map database, obtaining a first GPS coordinate corresponding to the first geographic information if the first geographic information is in the map database, and storing the first GPS coordinate as a first POI.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
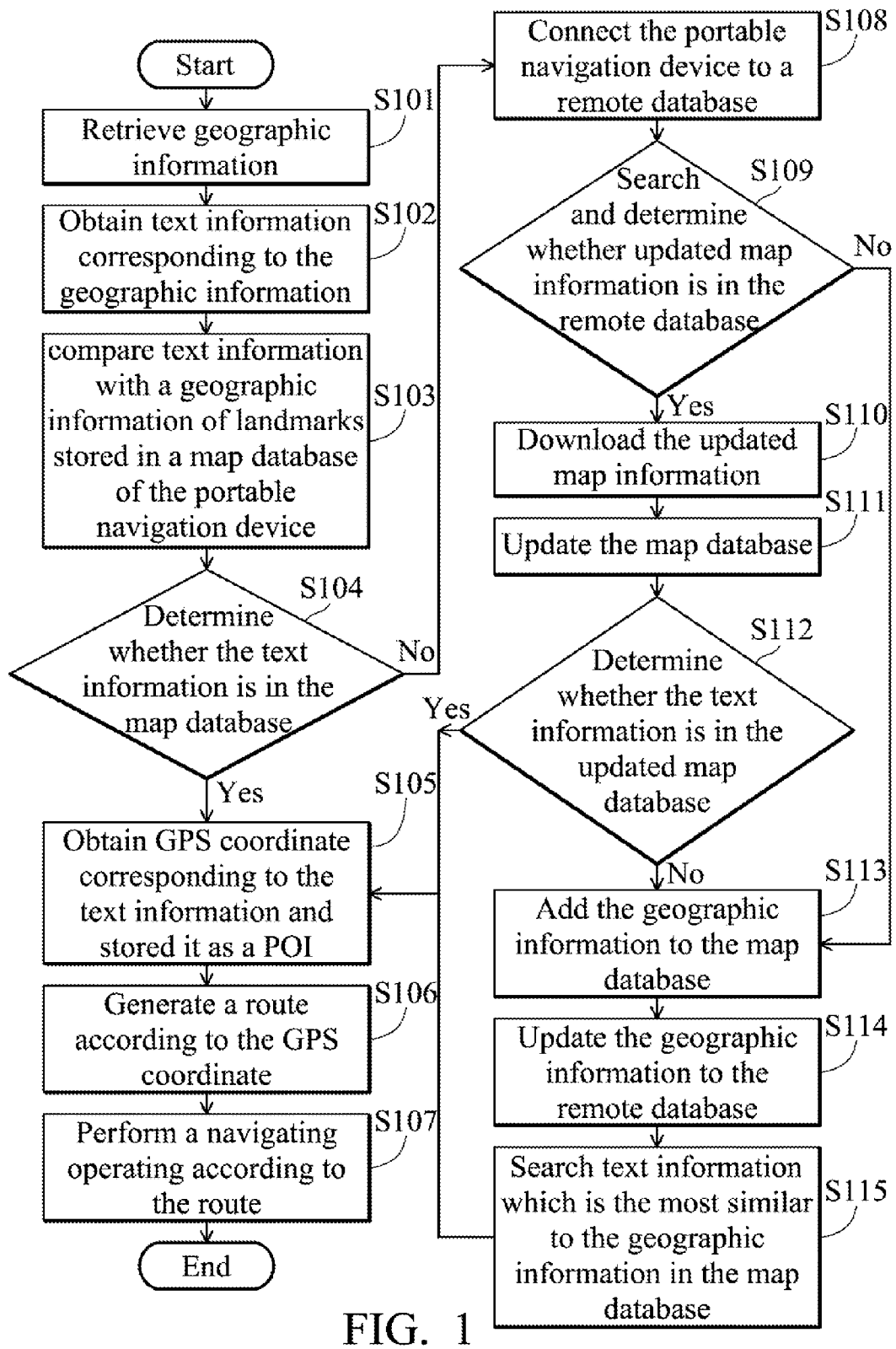
FIG. 1 is a flowchart of a method for automatically creating POI by identifying geographic information on a screen of a portable navigation device of the present invention.

Several exemplary embodiments of the invention are described with reference to FIGS. 1 through 3, which generally relate to automatically creating POI by identifying geographic information on a screen of a portable navigation device. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a method and system for automatically creating POI by identifying geographic information on a screen of a portable navigation device.

An embodiment of the method and system for automatically creating POI by identifying geographic information on a screen of a portable navigation device obtains corresponding GPS coordinate according to a geographical name (Geoname), a geographical location (Geolocation), or a point of interest (POI) shown in a web page on the screen of the portable navigation device or by recognizing an address or a telephone number shown in the web page on the screen of the portable navigation device for navigation. For example, an information page (a page of a travel website, for example) shown on the screen of the portable navigation device displays travel information of multiple scenic spots (i.e. POIs), comprising geographical names, addresses, geographical positions, landmarks, and so forth. When a scenic spot is retrieved, the method compares the scenic spot with a preset map database, obtains a corresponding GPS coordinate if the scenic spot is in the map database, and enables automatic navigation of a navigation system of the portable navigation device for the scenic spot, and displays navigation information on the screen of the portable navigation device.

FIG. 1 is a flowchart of a navigation method for automatically creating POI by identifying geographic information on a screen of a portable navigation device of the present invention.

Geographic information (comprising a geographical name, a geographical location, or a point of interest (POI), an address, a telephone number, and so forth) is retrieved from an information page (a page of a travel website, for example) shown on the screen of the portable navigation device (step S101). A recognition operation is performed to the geographic information to obtain text information corresponding to the geographic information (step S102). For example, when address information of a scenic spot is retrieved, the recognition operation is performed to the address information to obtain a correct address.

The text information is compared with a geographic information of landmarks stored in a map database of the portable navigation device (step S103) to determine whether the text information is in the map database (step S104). A first GPS coordinate corresponding to the text information is obtained if the text information is in the map database and stored as a first POI (step S105). A first route is generated according to the first GPS coordinate (step S106). A navigating operating is performing according to the first route, thus navigating to the first POI (step S107).

If the text information is not stored in the map database, the portable navigation device is connected to a remote database via a wireless network module of the portable navigation device (step S108) and searches and determines whether updated map information is in the remote database (step S109). If the updated map information exists, the updated map information is downloaded (step S110) to update the map database of the portable navigation device (step S111). Next, it is determined whether the text information is in the updated map database (step S112). The steps S105-S107 are repeated if the text information is in the updated map database.

If the map information in the map database is not the latest version or the text information is not stored in the map database, the geographic information is added to the map database (step S113), while the geographic information is updated to the remote database via the wireless network module of the portable navigation device (step S114) and text information which is the most similar to the geographic information is searched in the map database (step S115). Next, a second GPS coordinate corresponding to the searched text information is obtained and stored as a second POI, a second route is generated according to the second GPS coordinate, and displays the second route and guiding messages corresponding to the second route are displayed on the screen of the portable navigation device (steps S105-S107).

Note that recognition of geographic information can be implemented using optical character recognition (OCR).

Note that recognizable geographic information comprises a geographical name, a geographical location, a point of interest, an address, a telephone number, a landmark, a scenery picture, a uniform resource locator (URL) address or event description corresponding to the geographic information.

Figure 2:
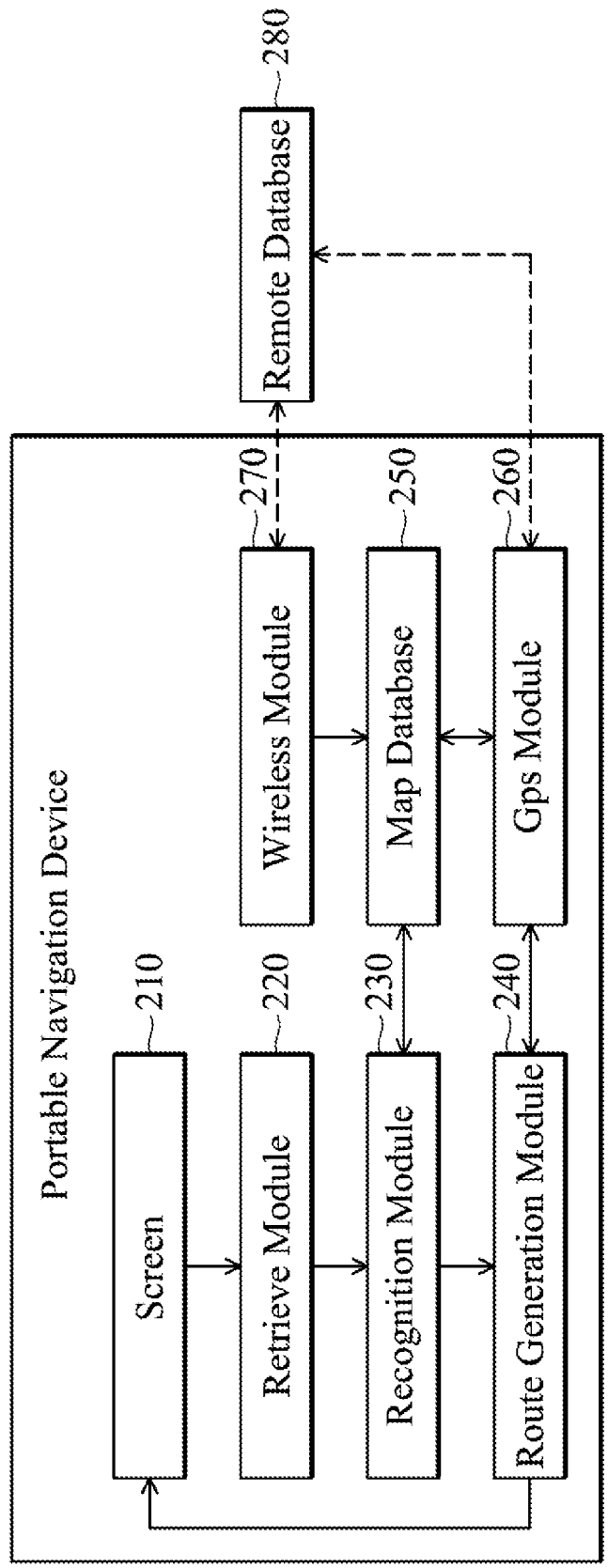
FIG. 2 is a schematic view of a system for automatically creating POI by identifying geographic information on a screen of a portable navigation device of the present invention.

FIG. 2 is a schematic view of a system for automatically creating POI by identifying geographic information on a screen of a portable navigation device of the present invention.

An exemplary embodiment of a system for automatically creating POI by identifying geographic information on a screen of a portable navigation device comprises a screen 210, a retrieve module 220, a recognition module 230, a route generation module 240, a map database 250, a GPS module 260, and a wireless module 270.

The retrieve module 220 retrieves a first geographic information (comprising a geographical name, a geographical location, or a point of interest (POI), an address, a telephone number, and so forth) from an information page shown on the screen 210 and transmits the first geographic information to the recognition module 230. The recognition module 230 performs a recognition operation to the first geographic information to obtain text information corresponding to the first geographic information and transmits the text information to the route generation module 240. For example, when address information of a scenic spot is retrieved, the recognition operation is performed to the address information to obtain a correct address.

The route generation module 240 compares the text information with a geographic information of landmarks stored in the map database 250 to determine whether the text information is in the map database 250 and obtains a first GPS coordinate corresponding to the text information from the map database 250 or via the GPS module 260 if the text information is in the map database 250, stores the first GPS coordinate as a first POI, generates a route according to the first GPS coordinate, and performs a navigating operation according to the first route, thus navigating to the first POI on the screen 210.

If the text information is not stored in the map database, the route generation module 240 connects to a remote database 280 via the wireless network module 270 and searches and determines whether updated map information is in the remote database 250. If updated map information is exists, the route generation module 240 downloads the updated map information to update the map database 250. Next, the route generation module 240 determines whether the text information is in the updated map database 250 and repeats the described retrieve, generation, and display operations if the text information is in the updated map database.

If the map information in the map database 250 is not the latest version or the text information is not stored in the map database 250, the route generation module 240 adds the geographic information to the map database 250, updates the geographic information to the remote database 280 the wireless network module 270, and searches text information which is the most similar to the first geographic information in the map database 250. Next, the route generation module 240 obtains a second GPS coordinate corresponding to the searched text information, generates a second route according to the second GPS coordinate, and displays the second route and guiding messages corresponding to the second route on the screen 210.

Figure 3:
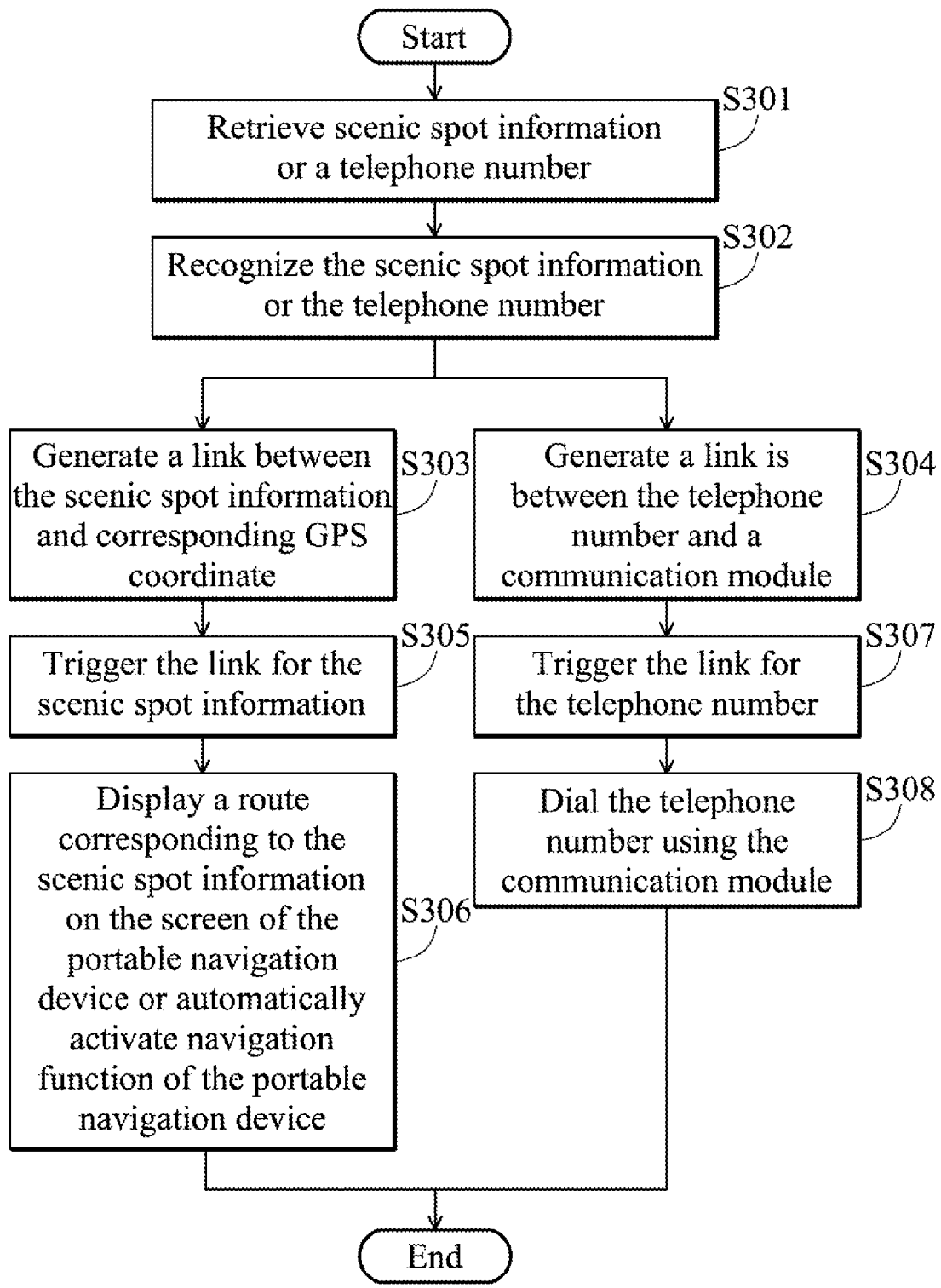
FIG. 3 is a flowchart of another embodiment of a method for automatically creating POI by identifying geographic information on a screen of a portable navigation device of the present invention.

FIG. 3 is a flowchart of another embodiment of a method for automatically creating POI by identifying geographic information on a screen of a portable navigation device of the present invention.

A scenic spot information (a geographic name or an address, for example) or a telephone number is retrieved from an information page (a page of a travel website, for example) shown on a screen of a portable navigation device (step S301). The scenic spot information or the telephone number is recognized (step S302). When the recognizing operation is completed, a link is generated between the scenic spot information and corresponding GPS coordinate (step S303) or between the telephone number and a communication module of the portable navigation device (step S304). For example, in step S303, a link between the scenic spot information and corresponding GPS coordinate is generated by comparing the scenic spot information with a geographic information of landmarks stored in a map database, determining whether the scenic spot information is stored in the map database and generating a link between the scenic spot information and corresponding GPS coordinate if the scenic spot information is stored in the map database.

When the link for the scenic spot information is triggered (step S305), a route corresponding to the scenic spot information is displayed on the screen of the portable navigation device or navigation function of the portable navigation device is automatically activated (step S306). When the link for the telephone number is triggered (step S307), the communication module dials the telephone number (step S308).

A display style of the scenic spot information is changed when the link is generated. The change of the display style, for example, comprises changing text colors of the scenic spot information, underlining the scenic spot information, enlarging or narrowing text of the scenic spot information, or displaying the scenic spot information by bold words.

When the link of the scenic spot information or the telephone number is generated, a display style of the link would be changed at the same time. The change of the display style comprises changing text colors of the link, underlining the link, enlarging or narrowing text of the link, or displaying the link by bold words.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for automatically creating POI by identifying geographic information on a screen of a portable navigation device, comprising:
    a screen;
    a map database;
    a GPS module;
    a wireless module;
    a retrieve module, retrieving a first geographic information from the information page shown on the screen;
    a recognition module, retrieving the first geographic information from the retrieve module and performing a recognition operation to the first geographic information; and
    a route generation module, retrieving the first geographic information from the recognition module, comparing the first geographic information to a geographic information of landmarks stored in the map database to determine whether the first geographic information is in the map database, obtaining a first GPS coordinate corresponding to the first geographic information from the map database or via the GPS module if the first geographic information is in the map database, and storing the first GPS coordinate as a first POI.

2. The system as claimed in claim 1, wherein the route generation module further generates a first route according to the first GPS coordinate, displays the first route and performs a navigating operation according to the first route, thus navigating to the first POI on the screen of the portable device.

3. The system as claimed in claim 1, wherein the route generation module connects to a remote database via the wireless network module if the first geographic information is not stored in the map database, searches and determines whether updated map information is in the remote database, and downloads the updated map information to update the map database of the portable navigation device if the updated map information exists, and the route generation module determines whether the first geographic information is in the updated map database, obtains the first GPS coordinate corresponding to the first geographic information if the first geographic information is in the updated map database, generates the first route according to the first GPS coordinate, performing a navigating operation according to the first route, thus navigating to the first POI on the screen of the portable device.

4. The system as claimed in claim 1, wherein the route generation module adds the first geographic information to the map database if the first geographic information is not stored in the map database, updates the first geographic information to a remote database via the wireless network module, searches, in the map database, for second geographic information which is the most similar to the first geographic information, obtains a second GPS coordinate corresponding to the second geographic information, generates a second route according to the second GPS coordinate, and displays the second route and guiding messages corresponding to the second route on the screen.

5. The system as claimed in claim 1, wherein the first geographic information includes a geographical name, a geographical location, a point of interest, an address, a telephone number, a landmark, a scenery picture, a URL address or event description corresponding to the first geographic information.

6. The system as claimed in claim 1, wherein the recognition module performs the recognition operation to the first geographic information to retrieve text information corresponding to the first geographic information.

7. The system as claimed in claim 6, wherein the text information includes an address, a telephone number, or a USL address corresponding to the first geographic information.

8. A method for automatically creating POI by identifying geographic information on a screen of a portable navigation device, comprising:
retrieving a scenic spot information from an information page shown in the screen of the portable navigation device;
recognizing the scenic spot information;
comparing the scenic spot information to geographic information of landmarks stored in a map database of the portable navigation device when the recognizing operation is complete;
determining whether the scenic spot information is in the map database; and
generating a link between the scenic spot information and a corresponding GPS coordinate if the first scenic spot information is in the map database.

9. The method as claimed in claim 8, wherein a route corresponding to the scenic spot information is displayed on the screen when the link is triggered.

10. The method as claimed in claim 8, wherein a navigation function of the portable navigation device is automatically activated when the link is triggered.

11. The method as claimed in claim 8, wherein a display style of the scenic spot information is changed when the link is generated.

12. The method as claimed in claim 11, wherein the change of the display style comprises changing text colors of the scenic spot information, underlining the scenic spot information, enlarging or narrowing text of the scenic spot information, or displaying the scenic spot information by bold words.

13. A navigation method for automatically creating POI by identifying geographic information on a screen of a portable navigation device, comprising:
retrieving a telephone number from an information page shown on the screen of the portable navigation device;
recognizing the telephone number; and
generating a link between the telephone number and a communication module of the portable navigation device when the recognizing operation is complete.

14. The method as claimed in claim 13, wherein the communication module dials the telephone number when the link is triggered.

15. The method as claimed in claim 13, wherein a display style of the telephone number is changed when the link is generated.

16. The method as claimed in claim 15, wherein the change of the display style comprises changing colors of the telephone number, underlining the telephone number, enlarging or narrowing the telephone number, or displaying the telephone number by bold words.

* * * * *